(12) United States Patent
Schwob

(10) Patent No.: US 6,358,375 B1
(45) Date of Patent: Mar. 19, 2002

(54) METHOD AND DEVICE FOR PRODUCING FULLERENES

(75) Inventor: Yvon Schwob, Cannes (FR)

(73) Assignee: Association pour la Recherche et le Developpement des Methods et Processus Industries, of Paris, Paris (FR)

( * ) Notice: Subject to any disclaimer, the term of this patent is extended or adjusted under 35 U.S.C. 154(b) by 0 days.

(21) Appl. No.: 09/453,783

(22) Filed: Dec. 3, 1999

Related U.S. Application Data

(63) Continuation of application No. PCT/EP98/03399, filed on Jun. 5, 1998.

(30) Foreign Application Priority Data

Jun. 6, 1997 (FR) .............................. 97/07011

(51) Int. Cl.⁷ .................................. B01J 19/08
(52) U.S. Cl. ................ 204/173; 423/445 B; 423/449.1
(58) Field of Search ................................ 204/164, 173; 423/445 B, 449.1

(56) References Cited

U.S. PATENT DOCUMENTS 5,227,038 A * 7/1993 Smalley et al. ............. 204/173
6,099,696 A    8/2000 Schwob et al.

FOREIGN PATENT DOCUMENTS

| CA | 2154482      | 8/1994 |
| DE | 42 43 566 A1 | 6/1994 |
| DE | 43 02 144 A1 | 7/1994 |
| EP | 0 527 035 A1 | 2/1993 |
| WO | WO 86/02024  | 4/1986 |
| WO | WO 94/04461  | 3/1994 |
| WO | WO 94/17908  | 8/1994 |

* cited by examiner

*Primary Examiner*—Kishor Mayekar
(74) *Attorney, Agent, or Firm*—Leydig Voit & Mayer LTD

(57) ABSTRACT

The invention relates to a method and a device for the continuous production of carbon black with a high fullerene content. The device essentially consists of a plasma reactor (1), a downstream heat separator (2) to separate the non-volatile constituents and a cold separator (3) attached thereto.

20 Claims, 3 Drawing Sheets

METHOD AND DEVICE FOR PRODUCING FULLERENES

This is a continuation International Application No. PCT/EP98/03399, filed on Jun. 5, 1998, and which designates the U.S. The entire contents of this International Application are hereby incorporated by reference.

The invention relates to a method and a device for the continuous production of carbon black with a high fullerene content.

In the following the term fullerenes refers to molecular, chemically homogenous and stable fullerenes. Representatives of this group of fullerenes are $C_{60}$, $C_{70}$ or $C_{84}$. These fullerenes are generally soluble in aromatic solvents. A particularly preferred fullerene is the $C_{60}$ fullerene.

For the production of carbon black containing fullerenes several methods are known. However, the achievable concentration of fullerenes in the obtained carbon black is so low that a preparation of pure fullerenes is only possible with great expenditures. Due to the resulting high price of pure fullerenes interesting applications in different fields of technology are for economical reasons a priori not conceivable. The U.S. Pat. No. 5,227,038 for example, discloses an apparatus for a laboratory allowing to produce a few grams of fullerenes in a discontinuous way by means of an electric arc between carbon electrodes serving as a raw material. Apart from the fact that the produced amounts are tiny, the concentration of fullerenes $C_{50}$ in the deposited carbon black is very low and never exceeds 10% of the produced mass. Further, the fullerene $C_{60}$ is in this method present in a mixture with higher fullerene compounds requiring costly fractionation for an isolation with sufficient purity.

The U.S. Pat. No. 5,304,366 describes a method allowing a certain concentration of the product but using a system for filtering a gas circulation at a high temperature which is difficult to practically perform.

The EP-B1 0 682 561 describes a general method for the production of carbon black with a nanostructure defined by the influence of a gaseous plasma on carbon at high temperatures. In product series obtained in this way fullerenes may at sufficient treatment temperatures be obtained in a continuous technical way.

However, the reaction products resulting from the method according to EP-B1 0 682 561 are very impure and contain apart from carbon which has not been transformed into fullerenes at best 10% fullerene $C_{60}$ as a mixture with higher fullerenes.

It was therefore the problem of the invention to develop a device and a method allowing to continuously produce carbon black with a high content of fullerenes.

Figure 1:
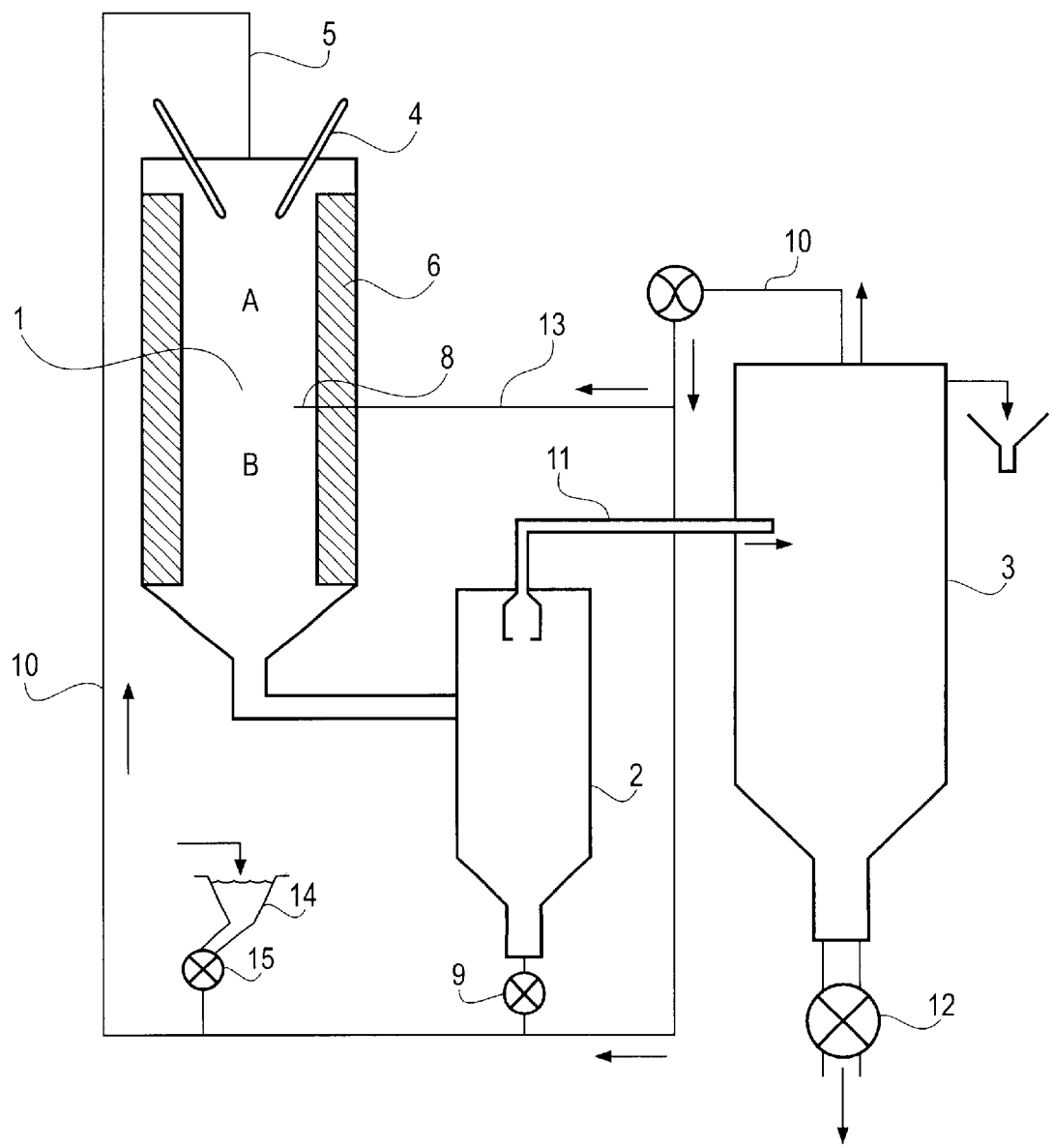
FIG. 1: shows an embodiment of the device according to the invention, consisting essentially of a plasma reactor (1) with a first reaction chamber (A) and a second reaction chamber (B), a downstream heat separator and an attached cold separator (3).
Figure 2:
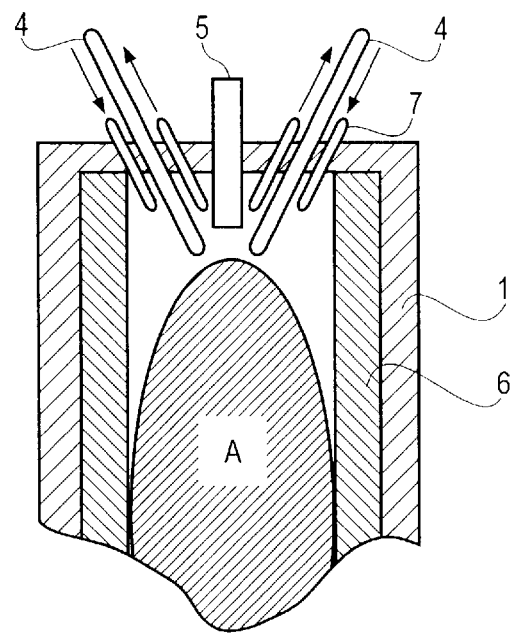
FIG. 2: shows a detail of the head put of the plasma reactor (1) comprising essentially the first reaction chamber (A).
Figure 3:
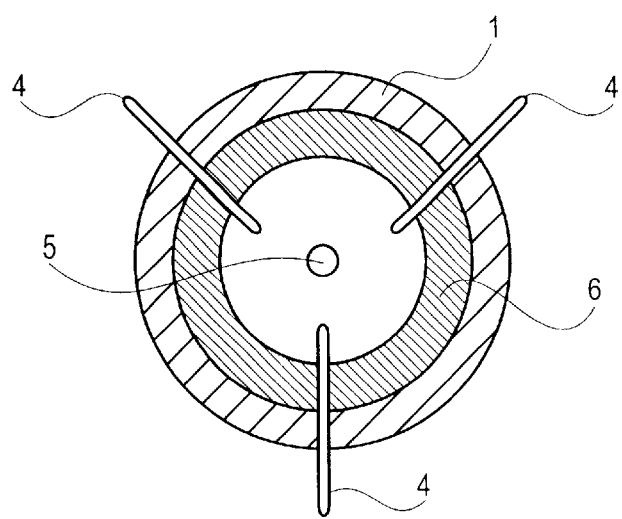
FIG. 3: shows a top view of the reactor (1) illustrating an embodiment of the invention with three electrodes (4) distributed with an angle of 120°, a central supply device (5) for the carbon-containing material and a heat resistant and heat isolating lining.

The device according to the invention comprises the following components:

a) a plasma reactor (1) comprising a first reaction chamber (A) into which two or more electrodes (4) are inserted; the first reaction chamber (A) further comprising a supply arrangement (5) for the plasma gas and the carbon-containing compounds delivering the plasma gas and the carbon-containing compounds centrally into the reaction zone; the plasma reactor (1) comprising a second reaction chamber (B) adjacent to the first reaction chamber (A) comprising suitable arrangements for cooling the reaction mixture exiting from the first reaction chamber (A), b) a heat separator (2) attached to the plasma reactor, and c) a cold separator (3) attached to the heat separator (2).

The plasma reactor (1) consists preferably of a cylindrically-shaped metal casing which may, if needed, be designed with a double wall. In this double wall a suitable cooling means may circulate. In the metal casing further an isolation (6) may be provided consisting generally of graphite or additionally of a ceramic layer. The first reaction chamber (A) is only used for the plasma reaction at very high temperatures.

According to the invention two or more, preferably three electrodes (4) are inserted into the head part of the first reaction chamber (A). The electrodes are preferably arranged with an angle to the axis so that they form in the upper part of the first reaction chamber (A) an intersection and that they can individually and continuously be adjusted by conduit glands (7). The tilt with respect to the vertical axis is preferably in the range of 15° to 90°, however, in all cases the tilt is such that an easy start of the arc producing the plasma is possible and that a maximal stability of the plasma is assured.

Preferably, the electrodes (4) are equally distributed so that with three electrodes an angular distance of 120° results. Typically plasma electrodes are used which are common in the field of the experts. These electrodes consist typically of a graphite as pure as possible in the form of a cylindrical rod having generally a diameter of a few centimeters. If needed, the graphite may contain further elements having a stabilizing influence on the plasma.

The electrodes are generally operated with an alternating voltage between 50 and 500 volts. The applied power is typically in the range of 40 kW to 150 kW. A suitable control of the electrodes provides a constant and stable plasma zone. The electrodes are automatically readjusted corresponding to their consumption.

The supply device (5) serves as a feeding unit for the carbon-containing compounds as well as for the plasma gas. Devices allowing a constant supply common for an expert can be used to this end. The supply is preferably centrally into the plasma zone controlled by the electrodes. The second reaction chamber (B) comprises suitable devices for an effective and selective cooling of the reaction mixture exiting from the first reaction chamber (A). In a preferred embodiment a supply device (8) may be provided thereto allowing for example by a cyclone effect a suitable distribution of, for example a plasma gas or, if needed, another cooling means.

According to the invention, the reaction mixture exiting from the second reaction chamber (B) is delivered to a heat separator (2). The heat separator (2) is preferably designed in the form of an isolated or isothermally heated cyclone, containing in the lower part a lock (9) for the separation of the non-volatile components, a conduit (10) for the recovery of the non-volatile components into the plasma reactor (10) and in the upper part a conduit (11) for leading the volatile components into the cold separator (3). The isothermal heating of the cyclone can be achieved by common measures.

Alternatively, the heat separator may be replaced by a suitable heat-resistant filter. Such a filter can, for example, consist of heat-resisting materials and of a porous ceramic, a metal frit or graphite foam. As in the case of the heat separator devices which are not shown, may allow a recovery of the separated solid compounds and lines may be provided for leading the gaseous compounds into the cold separator (3).

A cold separator (3) is connected to the heat separator (2) preferably in the form of a cyclone which can be cooled and which comprises in the lower part a lock (12) for the separation of the carbon black containing the fullerenes and in the upper part a conduit (10) for guiding the plasma gas back into the plasma reactor (1).

The cooling of this cyclone may be carried out in a standard way, for example by means of a cooling jacket supplied with a cooling fluid.

In a further embodiment of the device according to the invention a conduit (13) for the supplying of the cooling device of the second reaction chamber (B) may be branched off from the conduit (10).

Further, also an entry device (14) for the carbon-containing material may be present allowing to feed the carbon-containing material via a lock (15) into the conduit (10).

A further subject of the invention is a method for the production of carbon black with a high content of the fullerenes mentioned at the beginning from carbon-containing compounds in a plasma by means of the above-described device according to the invention. The invention relates in particular to the production of carbon black with a high content of $C_{60}$ fullerenes.

Preferably, the temperature of the plasma is adjusted so that the greatest volatility possible of the inserted carbon-containing material is achieved. Generally the minimum of the temperature in the first reaction chamber (A) is 4000° C.

As the plasma gas preferably a noble gas or a mixture of different noble gases is used. Preferably helium, if needed in a mixture with a different noble gas, is used. The used noble gases should be as pure as possible.

Figure 4:
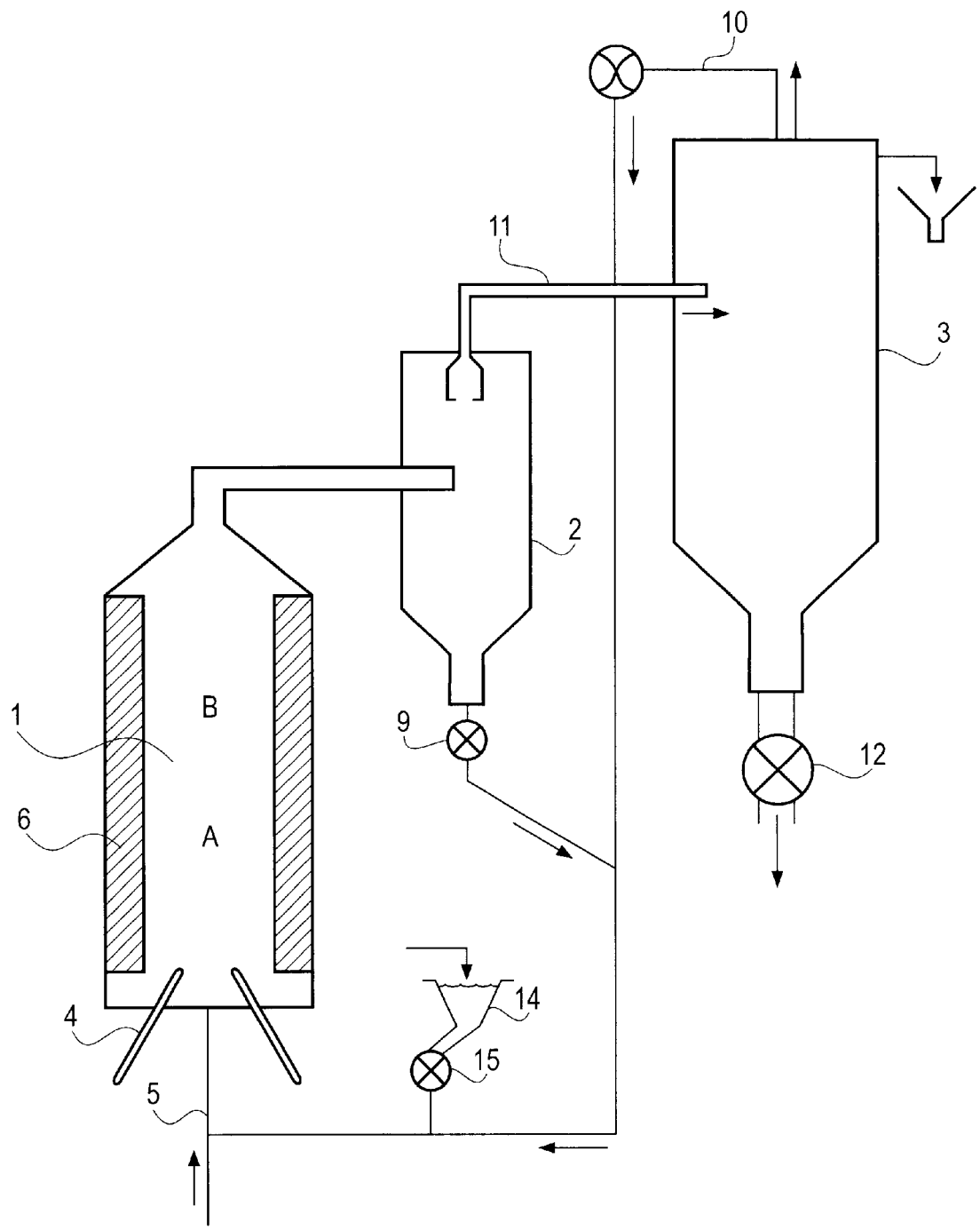
FIG. 4: shows a further embodiment of the device according to the invention consisting essentially of the same parts as FIG. 1, but wherein the flow of products in the plasma reactor (1) is directed opposite to gravity.

As the carbon-containing material preferably a highly pure carbon is used which is as free as possible of interfering and the quality of the fullerenes negatively influencing impurities. Impurities as for example, hydrogen, oxygen or sulfur reduce the production yield of fullerenes and form undesired byproducts. On the other hand any gaseous impurity present in the circulation of the production cycle causes a decrease of the purity of the plasma gas and requires the supply of plasma gas in a pure form to maintain the original composition. However, it is also possible to directly clean the plasma gas in the circulation of the production cycle. Preferably, highly pure, finely ground carbon powders e.g. acetylene black, graphite powders, carbon black, ground pyrolytic graphite or highly calcinated coke or mixtures of the mentioned carbons are used. In order to obtain an optimal evaporation in the plasma, the mentioned carbon powders are preferably as fine as possible. Coarser carbon particles may pass the plasma zone without being vaporized. In this case a device according to FIG. 4 may help wherein the carbon particles reach the plasma zone in the opposite direction with respect to gravity.

The carbon-containing material is preferably together with the plasma gas supplied via the supply arrangement (5) into the plasma reactor.

The plasma gas contains the carbon-containing material preferably in an amount of 0.1 kg/m$^3$ to 5 kg/m$^3$.

The reaction mixture formed in the reaction chamber (A) is, as already mentioned above, with a sufficient efficiency cooled in the second reaction chamber (B) to keep it at a temperature of preferably between 1000° C. and 2700° C. for a defined time of generally fractions of a second up to a second. In this phase the gaseous carbon molecules exiting from the first reaction chamber (A) recombine to the fullerenes mentioned at the beginning.

The cooling is achieved, as shown above, by suitable cooling devices, preferably by a homogenous distribution of a defined amount of cold plasma gas in the second reaction chamber (B). This cold plasma gas is preferably obtained from the recirculating plasma gas.

At the exit of the second reaction chamber (B) the mixture consists generally of the plasma gas, the desired fullerenes in a gaseous state, a fraction of the non-converted raw material and of non-vaporizable fullerenes.

In the heat separator (2), which is, as shown above, provided as a cyclone, the solid puts are separated from the gaseous parts by means of the cyclone effect.

The desired fullerene, which is volatile itself, can therefore with a yield of up to 90% be separated from the other non-volatile carbon compounds.

The beat separator (2) is kept by known means isothermally on a temperature of preferably between 600° C. to 1000° C. to avoid any condensation of the desired fullerenes in any of their parts.

A lock (9) at the bottom of the heat separator (2) allows to lead the carbon which was not converted into the desired fullerene back into the gas circulation, for example by means of a blowing engine.

The above-mentioned but not in detail explained filter may fulfill the same function as the above-discussed heat separator (2).

A cold separator (3) follows the heat separator (2). This cold separator is by means of any known means cooled to a temperature sufficient for the condensation of the desired fullerene, preferable of a temperature ranging from room temperature up to 200° C.

At the exit of the cold separator (3) generally a powder-like material accumulates containing carbon black with a fraction of the desired fullerenes of up to 40%.

Thanks to the lock (12) the carbon black with the accumulated desired fullerenes may be taken from the process, and be subjected to further purification. The further purification may be carried out in accordance with a known method, for example by extraction (Dresselhaus et al., Science of Fullerenes and Carbon Nanotubes, Academic Press, 1996, Chapter 5, pp. 111, in particular Chapters 5.2 and 5.3).

The plasma gas coming from the cold separator (3) can be lead back, for example by means of a blowing machine, via the conduit (10) into the plasma reactor (1).

A branch (13) of this conduit (10) allows to guide a part of the cold flow back into the second reaction chamber (B) for cooling the reaction mixture.

The following examples illustrate the subject matter of the invention, however, without limiting it to the scope of the examples.

EXAMPLES

Example 1

The device consists of a cylindrical reactor with an inner diameter of 300 mm, a height of 150 cm and a double-walled cooling jacket with water circulation. Between the graphite lining and the inner wall of the pressure chamber an isolating layer of graphite foam is arranged. Three graphite electrodes with a diameter of 20 mm are positioned with a sliding device through the reactor cover by means of conduit glands inserted into electrically isolating sockets. A central conduit with a diameter of 3 mm serves for introducing the graphite suspension into the plasmagenic gas. The plasma gas is pure helium kept in a circulation.

The electrodes are supplied with an alternating voltage such that the supplied power is 100 kW.

By a means of a three-phase controller of the type used in an arc furnace comparatively constant electrical properties on the plasma level are achieved. In this way a plasma temperature of approximately 5000° C. is kept in the reaction chamber (A).

The reaction chamber (B) is provided with cold gas guided back to keep its temperature on a value of approximately 1600° C.

The raw material is micronized graphite of the type TIMREX® KS 6 of Timcal AG, CH-Sins. With an amount of gas of 10 m³/h on the height of the entrance of the reactor and a material addition of 10 kg/h, a permanent state is achieved after an operating time of 1 hour. In the heat separator (2), kept on a temperature of 800° C., 8 kg/h of non-volatile carbon compounds were separated via the lock (9) and recovered. It was found that approximately 6% of the introduced carbon was under these conditions converted into the gaseous fullerene $C_{60}$. With an efficiency of the heat separator of approximately 90% the fullerene $C_{60}$ was to a small extent mixed with non-volatile carbon compounds and helium. This aerosol was transmitted to the cold separator (3) kept on a temperature of 150° C.

The product accumulating at the bottom of the cold separator (3) was during constant operation removed from the lock (12) in an amount of 2 kg/h and consisted of 30% fullerene $C_{60}$ as a mixture with non-converted carbon.

The obtained product can in this state be used, however it was further purified according to Dresselhaus et al., Science of Fullerenes and Carbon Nanotubes, Academic Press, 1996, Chapter 5, pp. 111, in particular Chapters 5.2 and 5.3, by extraction with toluol. The exemplary production allows the production of 0.6 kg/h of pure fullerene $C_{60}$.

Example 2

The method according to example 1 was repeated, only helium was replaced by argon. Under these conditions pure fullerene $C_{60}$ could be obtained after purification in the amount of 0.4 kg/h.

Example 3

The method according to example 1 was repeated, only the heat separator (2) was replaced by a filter of porous ceramic. The gas flow coming from the filter and entering the cold separator (3) consisted only of helium mixed with gaseous fullerene $C_{60}$. The efficiency of the filter was approximately 90%. According to this method pure fullerene $C_{60}$ could be obtained after purification with an amount of 0.6 kg/h.

Example 4

A method according to example 1 was repeated, only the micronized graphite was replaced by a highly pure acetylene black of the company SN2A, F-Berre l'Etang. With this method pure fullerene $C_{60}$ with an amount of 0.8 kg/h could be obtained after purification.

Example 5

The method according to example 1 was repeated, only the micronized graphite was replaced by a highly pure, degassed pyrolytic graphite of the type ENSACO Super P of the company MMM-Carbon, B-Brussels. With this method pure Merene $C_{60}$ with an amount of 0.7 kg/h could be obtained after purification.

What is claimed is:

1. A method for the continuous production of carbon black with a high content of fullerenes comprising:
   converting carbon-containing compounds in plasma by means of a plasma reactor comprising a first reaction chamber in which two or more electrodes are inserted, wherein the first reaction chamber further includes a supply arrangement for plasma gas and the carbon-containing compounds leading the plasma gas and the carbon-containing compounds centrally into the first reaction chamber, wherein the plasma reactor includes a second reaction chamber adjacent to the first reaction chamber having devices for cooling a reaction mixture exiting from the first reaction chamber; and
   directing the reaction mixture, exiting from the second reaction chamber, to a heat separator attached to the plasma reactor and then to a cold separator attached to the heat separator.

2. The method according to claim 1, wherein the plasma in the first reaction chamber has a minimal temperature of 4000° C.

3. The method according to claim 1, wherein a noble gas or a mixture of different noble gases is used as the plasma gas.

4. The method according to claim 1, wherein helium is used as the plasma gas.

5. The method according to claim 1, wherein highly pure carbon is used as the carbon-containing compound.

6. The method according to claim 1, wherein the temperature in the second reaction chamber is regulated by a supply of cool plasma gas from a supply device.

7. The method according to claim 1, wherein the temperature in the second reaction chamber is kept at a temperature between 1000° C. to 2700° C.

8. The method according to claim 1, wherein the heat separator is isothermally kept at a temperature of 600° C. to 1000° C.

9. The method according to claim 1, wherein the cold separator is operated at a temperature ranging from room temperature to 200° C.

10. The method according to claim 5, wherein the cold carbon-containing compound is selected from the group consisting of acetylene black, graphite powder, carbon black, ground pyrolytic graphite, highly calcinated coke, and mixtures thereof.

11. The method according to claim 1, wherein the plasma reactor is provided with a heat-resistant and heat-isolating lining.

12. The method according to claim 11, wherein the lining consists of graphite.

13. The method according claim 1, wherein the two or more electrodes are arranged with an angle to an axis of the first reaction chamber in such a way that they form the upper part of the first reaction chamber an intersection and that they are individually adjustable in the direction of their axis by means of conduit glands inserted into the first reaction chamber.

14. The method according to claim 13, wherein three electrodes are used, which are operated with a three-phase-alternating voltage and consist of graphite.

15. The method according to claim 1, wherein a supply arrangement for the plasma gas is provided as the device for cooling.

16. The method according to claim 1, wherein the heat separator is provided in the form of an isothermally heated cyclone, comprising in the lower part a lock for the separation of non-volatile compounds and a conduit for guiding the non-volatile compounds back into the plasma reactor and a conduit in the upper part for guiding volatile compounds into the cold separator.

17. The method according to claim 1, wherein the heat separator is provided in the form of a heat-resistant filter.

18. The method according to claim 1, wherein the cold separator is provided in the form of a cooled cyclone, including in the lower part a lock for the separation of the carbon black containing the fullerenes and in the upper part a conduit for guiding the plasma gas back into the plasma reactor.

19. The method according to claim 18, wherein a further conduit is provided as a supply of the plasma gas into the second reaction chamber, said further conduit branching off from the conduit provided for guiding the plasma gas back into the plasma reactor.

20. The method according to claim 1, wherein the carbon-containing compounds are fed into the conduit via an entry device for the carbon-containing compounds, allowing to feed the carbon-containing compound via a lock into the conduit.

* * * * *

UNITED STATES PATENT AND TRADEMARK OFFICE
CERTIFICATE OF CORRECTION

PATENT NO.   : 6,358,375 B1
DATED        : March 19, 2002
INVENTOR(S)  : Schwob

It is certified that error appears in the above-identified patent and that said Letters Patent is hereby corrected as shown below:

Column 4,
Line 28, "beat" should read -- heat --

Column 6,
Line 43, "C." should read -- C --

Column 7,
Line 8, change "the non-volatile" to -- non-volatile --

Signed and Sealed this

Fourth Day of June, 2002

Attest:

Attesting Officer

JAMES E. ROGAN
*Director of the United States Patent and Trademark Office*